(12) United States Patent
Hartley et al.

(10) Patent No.: US 9,727,589 B2
(45) Date of Patent: Aug. 8, 2017

(54) ENTERPRISE PROCESS DATABASE

(75) Inventors: John B. Hartley, North Fitzroy (AU);
Neil Penman, West Brunswick (AU)

(73) Assignee: International Business Machines Corporation, Armonk, NY (US)

( * ) Notice: Subject to any disclaimer, the term of this patent is extended or adjusted under 35 U.S.C. 154(b) by 2458 days.

(21) Appl. No.: 12/202,501

(22) Filed: Sep. 2, 2008

(65) Prior Publication Data
US 2010/0057766 A1    Mar. 4, 2010

(51) Int. Cl.
*G06F 17/30*    (2006.01)

(52) U.S. Cl.
CPC ............ *G06F 17/30289* (2013.01)

(58) Field of Classification Search
CPC ................................. G06F 17/30289
USPC ........................................ 707/804
See application file for complete search history.

(56) References Cited

U.S. PATENT DOCUMENTS

| 6,768,995 | B2 | 7/2004 | Thier et al. | |
|---|---|---|---|---|
| 2004/0249832 | A1 | 12/2004 | Goldthorpe | |
| 2005/0026129 | A1 | 2/2005 | Rogers | |
| 2005/0119905 | A1 | 6/2005 | Wong et al. | |
| 2007/0179825 | A1* | 8/2007 | Dreiling et al. | 705/7 |
| 2007/0179826 | A1* | 8/2007 | Cutlip et al. | 705/7 |
| 2009/0018877 | A1* | 1/2009 | Houck et al. | 705/7 |

* cited by examiner

*Primary Examiner* — Kris Mackes
(74) *Attorney, Agent, or Firm* — George R. McGuire; Bond Schoeneck & King, PLLC; John Pivnichny

(57) ABSTRACT

Systems and methods for providing an enterprise level view of an organization's data including an SOA business process server, an enterprise meta model and an enterprise database. The SOA business process server and enterprise meta model are synchronized by automated tools so that a change to one of these components will be reflected in the other. The enterprise database is populated by data automatically extracted from a process engine of the business process server. The enterprise database is populated in real time so that enterprise level views based on the enterprise database will be accurate in real time.

19 Claims, 1 Drawing Sheet

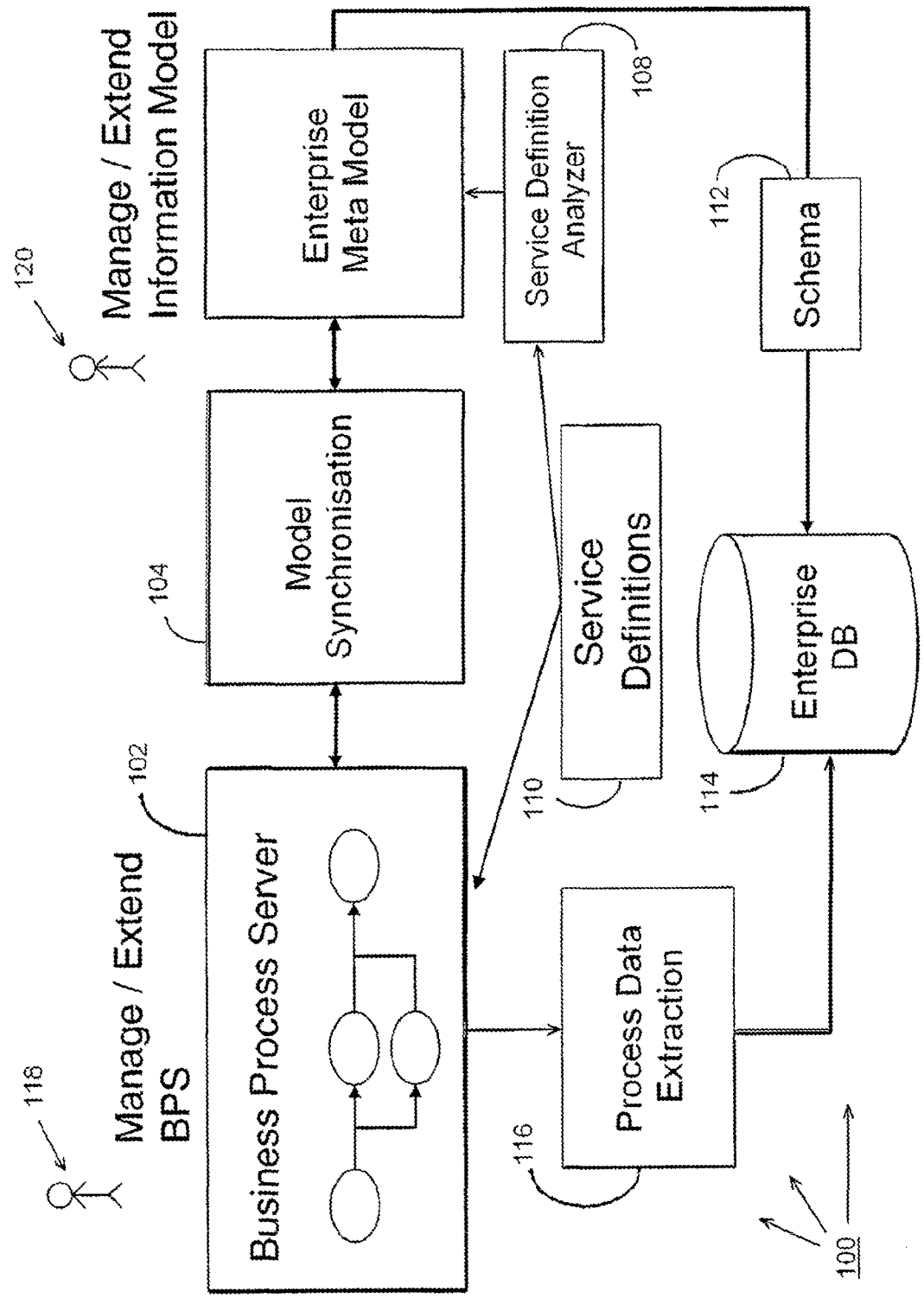

ENTERPRISE PROCESS DATABASE

BACKGROUND

1. Field of the Invention

The present invention relates to business process servers (especially business process servers implemented with Service Oriented Architecture, or "SOA"), enterprise models, enterprise meta models and enterprise databases.

2. Description of the Related Art

Business process servers are conventional. Business process servers implemented with SOA are conventional. Enterprise models, enterprise meta models and enterprise databases are conventional. Enterprise data warehouses are conventionally used to provide an enterprise level view of information.

U.S. Pat. No. 6,768,995 ("Thier") discloses an enterprise business planning system including a database. A transactional portion of the database receives information from enterprise contributors. The enterprise contributors contribute detailed financial forecasts, revenue forecasts, order forecasts, inventory forecasts, estimated resource requirements, and the like, depending on the particular enterprise planning activity being carried out by the enterprise.

US patent application 2004/0249832 ("Goldthorpe") discloses an enterprise model that is built in real time. In Goldthorpe, a universal framework defines the structure and representation of processes, knowledge, and interrelationships between processes and knowledge in an enterprise. After this universal framework is created, it is used for dynamically building a model of said enterprise in real time. The model represents the enterprise as an evolving system of interconnected processes and knowledge domains. The model is stored on an enterprise knowledge database and is made available over the computer network. In this way, both members of said enterprise (that is, network users) and computer applications can use the model in real time for managing execution of processes, and managing knowledge about and contained within processes and systems of processes.

Goldthorpe goes on to disclose that computer applications can make use of the Goldthorpe model and system. In one example, applications such as Interwoven Inc.'s Content Infrastructure suite of products use the knowledge database to generate metadata about where web content development fits within an enterprise's business processes. In another example, workgroup software or collaboration software accesses the knowledge database to determine the status of related processes. In another example, a customer relationship management system uses the knowledge database to add metadata about associations between a customer relationship process and product development processes to a native customer relationship management dataset. In yet another example, software routines are used by other applications for the addition of knowledge to the knowledge database.

US patent application 2005/0026129 ("Rogers") discloses the feature of maintaining synchronization between a process model and an information model. In Rogers, the process model is developed and then the reference information model is generated. A Reference Information Model is assembled that directly compliments the developed Process Model. The reference data provided to the Reference Information Model can be the data or information that directly correlates to the current action the worker is engaged in. For each task or category identified in the Process Model there is an associated Reference Identification Model. As the worker changes modes and/or progresses through the tasks of the work, the body of information of the Reference Information Model changes to accommodate the new actions of the worker. For example, within a diagnosis task of a Process Model a corresponding Reference Information Model identifies steps or tasks related to the diagnosis. The synchronization of the Reference Information Model to the Process Model is alleged to cause productivity improvements. It is noted that in ("Rogers") the data in the information model is gathered specifically to support the process, for purposes relating to task efficiency. In Rogers, the information model consists of data related to the execution of each task being processed.

US patent application 2005/00119905 ("Wong") discloses the feature of creating an information model based on business processes. Methods of managing information technology (IT) through auto discovery analysis achieves business relevance. The method may include providing IT service(s) to monitor an IT infrastructure. In this way, managed components of the infrastructure and business processes are discovered. These components and processes are supported by the infrastructure. An information model is formed based on the discovered components and the discovered business processes. The auto discovery analysis may include: performing network elements discovery; performing systems discovery; performing network flow discovery; performing batch process discovery; and performing middleware integration discovery.

Description Of the Related Art Section Disclaimer: To the extent that specific publications are discussed above in this Description of the Related Art Section, these discussions should not be taken as an admission that the discussed publications (for example, published patents) are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section, they are all hereby incorporated by reference into this document in their respective entirety(ies).

SUMMARY

The present invention is directed to a system, and associated methods, including an information meta model and a process model, where automated tools are used to maintain some degree of equivalence and/or synchronization between the two models. Preferably, the process model is created in SOA. Preferably, the information meta model is initially generated from service definitions. Preferably, both models can be extended by a person to include additional data relationships that were not included in the service definitions used to initially generate the information meta model. Preferably, the automated tools ensure that changes made to either one of the models will be reflected in the other model.

The information meta model may be used to create an enterprise database. Preferably, this enterprise database is populated by automatically extracting data from the processes being executed in a process engine. Preferably, the enterprise database will hold an enterprise view of an organization's data, and will span at least the same organizational functions covered by the SOA. In this way, when more business processes are implemented using the SOA, the more complete the integrated enterprise data view becomes.

In some preferred embodiments of the present invention, the enterprise database will be limited to the scope of the organization's SOA. However, in other embodiments of the present invention, the enterprise database may additionally be adapted to extend over the scope of conventional type enterprise data warehouses such that the enterprise database additionally extracts selected data, or even all data, from all systems irrespective of whether or not they have a web services interface. However, these expanded enterprise databases may be more difficult or expensive to make, and may not be as timely or up-to-date as preferred embodiments where the scope of the enterprise database is limited to the scope of the organization's SOA.

In at least some embodiments of the present invention, the data in the information model is enterprise data that has flowed through the process server and hence has been harvested. In at least some embodiments of the present invention, the data in the information model is not intended to support the process. In at least some embodiments of the present invention, the process execution is assumed to be managed by the BPS. Various embodiments of the present invention may exhibit one or more of the following objects, features and/or advantages:

(i) provides an integrated enterprise level view of information;

(ii) easier to design and maintain than a conventional enterprise data warehouse;

(iii) quicker to develop and/or modify than a conventional enterprise data warehouse;

(iv) less expensive than a conventional enterprise data warehouse;

(v) more timely information than that provided by a conventional enterprise data warehouse;

(vi) can be directly used to manage the business operations;

(vii) integrated enterprise data is available in "real time;"

(viii) enterprise model can be generated from the services model while the SOA solution is being implemented;

(ix) information meta model can be used to define processes using data driven language concepts;

(x) extension of the power of SOA to situations where a data paradigm is more appropriate than a process paradigm; and/or (xi) automatic optimization of process for more efficient process execution.

According to an aspect of the present invention, a method of providing an enterprise level view of an organization's data includes the following steps (not necessarily in the following order): (i) generating a plurality of service definitions; (ii) providing the plurality of service definitions to a business process server, with the business process server including a plurality of business processes being based on the plurality of service definitions; (iii) providing the plurality of service definitions to a service definition analyzer; (iv) parsing, in the service definition analyzer, the plurality of service definitions to create an enterprise meta model based on the plurality of service definitions; and (v) creating an enterprise level view of the organization's data at least partially based on the enterprise meta model.

According to a further aspect of the present invention, a system for providing an enterprise level view of an organization's data includes a service definition sub-system, a business process server, a service definition analyzer and an enterprise meta model. The service definition sub-system is adapted to generate a plurality of service definitions. The business process server is adapted to receive the plurality of service definitions from the service definition sub-system, and to create a plurality of business processes based on the plurality of service definitions. The service definition analyzer is adapted to receive the plurality of service definitions, and to parse the plurality of service definitions. The enterprise meta model is based on the plurality of service definitions as parsed by said service definition analyzer. The enterprise meta model is adapted to help create an enterprise level view of the organization's data.

According to a further aspect of the present invention, a method is used to provide business process for use in the business of an organization data. The method includes the following steps (not necessarily in the following order, except as specifically noted): (i) providing a business process server and an enterprise meta model, with both the business process server and the enterprise meta model being based on a plurality of service definitions; (ii) after the providing step, extending the enterprise meta model to include an additional data relationship not present in the plurality of service definitions; and (ii) after the extending step, automatically synchronizing the business process server with the enterprise meta model to reflect the additional data relationship.

According to a further aspect of the present invention, a method is used to provide an enterprise level view of an organization's data. The method includes the following steps (not necessarily in the following order): (i) providing a business process server and an enterprise meta model, with both the business process server and the enterprise meta model being based on a plurality of service definitions; (i) creating an enterprise database based on information from the business process server and the enterprise meta model; (iii) populating the enterprise database by automatically extracting data from processes being executed in a process engine of the business process server; and (iv) creating an enterprise level view of the organization's data at least partially based on the enterprise database.

According to a further aspect of the present invention, a system for providing an enterprise level view of an organization's data includes a business process server, an enterprise meta model, an enterprise database and a viewer. The business process server is based on a plurality of service definitions. The business process server includes a process engine. The enterprise meta model is based on the plurality of service definitions. The enterprise database is based on information from the business process server and the enterprise meta model. The enterprise database is adapted to be populated by data automatically extracted from processes executed by the process engine. The viewer is adapted to create an enterprise level view of the organization's data at least partially based on said enterprise database.

BRIEF DESCRIPTION OF THE DRAWING

The present invention will be more fully understood and appreciated by reading the following Detailed Description in conjunction with the accompanying drawing, in which:

The FIGURE is a schematic of a system according to the present invention.

DETAILED DESCRIPTION

The FIGURE shows a schematic of a system 100 according to the present invention including: business process server ("BPS") 102; model synchronization sub-system 104; enterprise meta model ("EMM") sub-system 106; service definition analyzer 108; service definition sub-system 110; schema sub-system 112; enterprise database 114; process data extraction sub-system 116; BPS user 118; and EMM maintainer 120. Components 102, 104, 106, 108, 110, 112, 114 and 116 may be implemented as any appropriate combination of computer hardware and/or computer software hardware now known or to be developed in the future, as will be appreciated by those of skill in the art. Preferably system 100 is implemented by a set of computing devices (of any type known or to be developed in the future) in some degree of data communication with each other over data communication network(s) (of any type known or to be developed in the future). Preferably, system 100 is implemented as components of a business process management platform. The FIGURE schematically shows data communication between the various components of system 100.

BPS (see DEFINITIONS section) 102 is an SOA (see DEFINITIONS section) business process server. An SOA architecture preferably describes a business level view of IT services provided by an organization's functional groups or business units. Generally, these services are used to implement integrated business processes that span organizational units and IT systems. In the operation of system 100, BPS data passes through BPS 102, as is conventional for BPSs.

Service definition sub-system 110 generates service definitions. The service definitions are provided to BPS 102 and to service definition analyzer 108. Service definition analyzer 108 parses the service definitions to create EMM sub-system 106. The EMM sub-system can be extended manually, by EMM maintainer 120, to add constraints and business rules on data elements.

Model synchronization sub-system 104: (i) parses business process definitions to extract data rules; (ii) analyzes process run time behavior to identify data rules; and (iii) creates new processes based on rules defined by EMM maintainer 120. Business rules are added to EMM sub-system 106 from analysis performed by model synchronization sub-system 104.

Enterprise database 114 is generated by EMM sub-system 106 as facilitated by schema sub-system 112. Enterprise database 114 is populated using data from BPS 102. More specifically, process data extraction sub-system 116 extracts data from running business processes and supplies it to the enterprise database. The process data extraction sub-system is configured using enterprise information meta model definitions. In this way, system 100 farms BPS data and also process meta data. Data items are linked using rules stored in EMM sub-system 106. These rules are based on relationships between service data elements. The process meta data is stored and/or located within the process that is managing the service calls. This farmed data is then stored in enterprise database 114.

The above-described operation of system 100 reflects the realization that information integration can be as critical to an organization as business process integration. Support for business level information integration is generally neglected in SOA thinking, but the present invention remedies this neglect. Systems and methods according to the present invention can be used to give information integration an equal role to process integration in an SOA architecture.

Now a specific example of a service definition and an associated portion of the enterprise meta model created based on the parsed version of the service definition will be set forth. In this illustrative example, a BPS has a single call to add a customer to a Siebel CRM system.

```
Service Definition
    Define element name Customer
        Name
        Street Address
        City Address
        Profession
    Define Operation Add_Cust_to_Siebel
        In: Customer
BPS process logic:
    # Add the customer to Siebel
    create object customer;
    customer.name=aName
    customer.street address=anAddress
    customer.city address=aCity
    customer.profession=aProfession
    call Add_Cust_to_Siebel (customer)
```

In response to the call to add a customer, a service definition analyzer creates the following portion of an EMM:

```
TABLE Customer
    Customer_id (Primary key)
    Name
    Street Address
    City Address
    Profession
```

Now an example will be given that shows how the enterprise meta model is changed in response to a change in the BPS. A new service definition is added for a service to create a customer in an SAP system. Code changes are also made to the BPS. The changes are shown by lines marked with a *** notation. In this example, the additional service definition is:

```
Define element client ***
    Name ***
    Address ***
    Post Code ***
    NetWorth ***
Define Operation Add_Client_to_SAP ***
    In: Client ***
```

In this example, the updated BPS process logic:

```
# Add the customer to Siebel
create object customer;
customer.name=aName
customer.street address=anAddress
customer.city address=aCity
customer.profession=aProfession
call Add_Cust_to_Siebel (customer)
# Also add the customer to SAP ***
create object client ***
client.name=aName ***
client.address=anAddress ***
client.PostCode=getPostCode(anAddress) ***
client.NetWorth=someNetWorth ***
```

In this example the updated EMM created by the service definition analyzer and a model synchronization sub-system is as follows:

```
TABLE Customer
    Customer_id (Primary key) ***
    Name ***
    Street Address ***
```

City Address ***
Profession ***
Post Code ***
NetWorth ***

Now the process syntax of the above examples will be discussed. A new table is preferably not created as the process logic shows a one to one equivalence between the client and the customer elements. This process logic can be defined in a graphical tool. If a graphical tool is used, the one to one equivalence can be made more explicit than by parsing the process syntax as shown in the above example. New columns for Name and Address are preferably not created as the process logic show that these are equivalent to existing columns. PostCode and NetWorth are added to the Customer table as they are new attributes. When the process code is executed, triggers can be fired to populate the above table, in order to create a view of the customer as understood by the SOA system.

DEFINITIONS

The following definitions are provided to facilitate claim interpretation:

Present invention: means at least some embodiments of the present invention; references to various feature(s) of the "present invention" throughout this document do not mean that all claimed embodiments or methods include the referenced feature(s).

First, second, third, etc. ("ordinals"): Unless otherwise noted, ordinals only serve to distinguish or identify (e.g., various members of a group); the mere use of ordinals implies neither a consecutive numerical limit nor a serial limitation.

Receives/provides: unless otherwise explicitly specified, these verbs should not be taken to imply: (i) any particular degree of directness with respect to the relationship between the verb's object and subject; and/or (ii) absence of intermediate components, actions and/or things interposed between the verb's object and subject.

Business process server: any sub-system for creating and using business processes including the hardware and/or software required to execute business processes.

SOA: any business process server where at least some of the business processes are packaged as services; preferably under SOA, the business process server defines and provisions IT infrastructure to allow different applications to exchange data and participate in business processes; SOA is not necessarily limited with respect to: (i) programming language(s); (ii) degree of interoperability; (iii) communication protocol(s); (iv) degree of integration between application(s); (v) use of messages; (vi) level of complexity; and/or (vii) use of web services.

To the extent that the definitions provided above are consistent with ordinary, plain, and accustomed meanings (as generally shown by documents such as dictionaries and/or technical lexicons), the above definitions shall be considered supplemental in nature. To the extent that the definitions provided above are inconsistent with ordinary, plain, and accustomed meanings (as generally shown by documents such as dictionaries and/or technical lexicons), the above definitions shall control. If the definitions provided above are broader than the ordinary, plain, and accustomed meanings in some aspect, then the above definitions shall be considered to broaden the claim accordingly.

To the extent that a patentee may act as its own lexicographer under applicable law, it is hereby further directed that all words appearing in the claims section, except for the above-defined words, shall take on their ordinary, plain, and accustomed meanings (as generally shown by documents such as dictionaries and/or technical lexicons), and shall not be considered to be specially defined in this specification. In the situation where a word or term used in the claims has more than one alternative ordinary, plain and accustomed meaning, the broadest definition that is consistent with technological feasibility and not directly inconsistent with the specification shall control.

Unless otherwise explicitly provided in the claim language, steps in method steps or process claims need only be performed in the same time order as the order the steps are recited in the claim only to the extent that impossibility or extreme feasibility problems dictate that the recited step order (or portion of the recited step order) be used. This broad interpretation with respect to step order is to be used regardless of whether the alternative time ordering(s) of the claimed steps is particularly mentioned or discussed in this document.

What is claimed is:

1. A method of providing an enterprise level view of an organization's data, the method comprising the steps of:
    providing a business process management platform comprising a business process server and a service definition analyzer;
    generating, by the business process management platform, a plurality of service definitions;
    providing the plurality of service definitions to the business process server, wherein the business process server comprises a plurality of business processes based on the plurality of service definitions;
    providing the plurality of service definitions to the service definition analyzer;
    parsing, in the service definition analyzer, the plurality of service definitions to create an enterprise meta model based on the plurality of service definitions;
    adding one or more business rules to the parsed enterprise meta model, wherein the one or more business rules are generated by a model synchronizer;
    harvesting enterprise data that has flowed through the business process server to add data to the enterprise meta model;
    updating the business process server to change at least one of a plurality of business processes of the business process server and automatically synchronizing the enterprise meta model with the business process server to reflect the change to the business process server; and
    creating an enterprise database based on information from the business process server and the enterprise meta model;
    populating the enterprise database with data by automatically extracting the data from processes being executed in a process engine of the business process server, wherein the data is linked using the one or more business rules of the enterprise meta model;
    creating, by the business process management platform, an enterprise level view of the organization's data at least partially based on the enterprise meta model, wherein the enterprise level view at least partially comprises data from the enterprise database; and
    displaying, on a viewer, the created enterprise level view.

2. The method of claim 1, wherein the business process server is a Service Oriented Architecture business process server.

3. The method of claim 2, wherein the enterprise meta model spans the scope of the Service Oriented Architecture.

4. The method of claim 2, further comprising the steps of:
creating an enterprise database based on information from the business process server and the enterprise meta model;
populating the enterprise database by automatically extracting data from processes being executed in a process engine of the business process server; and
during the creating-an-enterprise-level-view step, using data in the enterprise database to at least partially create the enterprise level view.

5. A system for providing an enterprise level view of an organization's data, the system comprising:
a business process management platform comprising:
a service definition sub-system adapted to generate a plurality of service definitions;
a business process server, including hardware and software required to execute business processes, adapted to receive the plurality of service definitions from the service definition sub-system, and to create a plurality of business processes based on the plurality of service definitions;
a service definition analyzer adapted to receive the plurality of service definitions, and to parse the plurality of service definitions;
an enterprise meta model created by the service definition analyzer and based on the plurality of service definitions as parsed by said service definition analyzer, the enterprise meta model including enterprise data harvested from data that has flowed through the business process server, with said enterprise meta model being adapted to help create an enterprise level view of the organization's data;
a model synchronizer configured to generate and add to the parsed enterprise meta model one or more business rules;
an enterprise database comprising data based on information from said business process server and said enterprise meta model, and comprising data extracted from processes being executed in a process engine of the business process server, wherein the data is linked using the one or more business rules of the enterprise meta model; and
a viewer configured to display the created enterprise level view;
wherein the business process management platform is configured to update the business process server to change at least one of a plurality of business processes of the business process server, and automatically synchronize the enterprise meta model with the business process server to reflect the change to the business process server.

6. The system of claim 5, wherein said business process server is a Service Oriented Architecture business process server.

7. The system of claim 6, wherein said enterprise meta model spans the scope of the Service Oriented Architecture.

8. The system of claim 6, wherein said business process server comprises a process engine, the system further comprising an enterprise database based on information from said business process server and said enterprise meta model and populated at least by data automatically extracted from processes being executed in said process engine of said business process server.

9. A method of providing business process for use in the business of an organization data, the method comprising the steps of:
providing a business process management platform comprising: (i) a business process server; (ii) a service definition analyzer, wherein the business process server comprises a plurality of service definitions generated by the service definition analyzer; (iii) a model synchronizer configured to generate and add one or more business rules to an enterprise meta model; and (iv) an enterprise database based on information from the business process server and the enterprise meta model, and comprising data linked using the one or more business rules of the enterprise meta model;
providing the enterprise meta model, wherein the enterprise meta model is based on the plurality of service definitions, and wherein the enterprise meta model is an information model;
extending the enterprise meta model to include an additional data relationship not present in the plurality of service definitions;
automatically synchronizing the business process server with the enterprise meta model to reflect the additional data relationship;
harvesting enterprise data that has flowed through the business process server to add data to the enterprise meta model; and
creating an enterprise level view of the organization's data at least partially based on the enterprise meta model; and
displaying, on a viewer, the created enterprise level view in real time.

10. The method of claim 9, wherein the synchronizing step is performed by an automated tool.

11. The method of claim 9, wherein the business process server is a Service Oriented Architecture business process server.

12. The method of claim 9, wherein the extending step is performed by a person.

13. The method of claim 9, further comprising the steps of:
after the providing step, changing the business process server to change at least one of a plurality of business processes of the business process server; and
after the changing step, automatically synchronizing the enterprise meta model with the business process server to reflect the change to the business process server.

14. A method of providing an enterprise level view of an organization's data, the method comprising the steps of:
providing a business process management platform comprising: (i) a business process server and a service definition analyzer, wherein the business process server comprises a plurality of service definitions generated by the service definition analyzer; and (ii) a model synchronizer configured to generate and add one or more business rules to an enterprise meta model;
providing the enterprise meta model, wherein the enterprise meta model is based on the plurality of service definitions;
creating an enterprise database based on information from the business process server and the enterprise meta model, wherein the enterprise database comprises a plurality of data items, wherein at least some of the plurality of data items are linked using the one or more business rules of the enterprise meta model;

populating the enterprise database by automatically extracting data from processes being executed in a process engine of the business process server;

creating an enterprise level view of the organization's data at least partially based on the enterprise database; and displaying, on a viewer, the created enterprise level view;

wherein the enterprise database and the enterprise level view reflect the organization's data on an ongoing real-time basis.

15. The method of claim 14, wherein the business process server is an SOA business process server.

16. The method of claim 14, wherein the enterprise database and the enterprise level view reflect the organization's data on an ongoing real-time basis.

17. A system for providing an enterprise level view of an organization's data, the system comprising:

a business process server, including hardware and software required to execute business processes, based on a plurality of service definitions, said business process server comprising a process engine;

an enterprise meta model based on the plurality of service definitions;

a model synchronizer configured to generate and add one or more business rules to the enterprise meta model;

an enterprise database based on information from said business process server and said enterprise meta model, with said enterprise database being adapted to be populated by data automatically extracted from processes executed by said process engine, wherein at least some of the data is linked using the one or more business rules of the enterprise meta model; and a viewer adapted to create an enterprise level view of the organization's data at least partially based on said enterprise database, wherein the system is configured to update the business process server to change at least one of a plurality of business processes of the business process server, and automatically synchronize the enterprise meta model with the business process server to reflect the change to the business process server.

18. The system of claim 17, wherein said business process server is a Service Oriented Architecture business process server.

19. The system of claim 17, wherein said enterprise database and said viewer are adapted to reflect the organization's data on an ongoing real-time basis.

* * * * *